United States Patent Office 2,848,475
Patented Aug. 19, 1958

2,848,475

SUBSTITUTED METHYLENE BIS (PHOSPHONIC ACID DIALKYL ESTERS)

Paul Schmidt, Therwil, Switzerland, assignor to Ciba Limited, Basel, Switzerland, a Swiss firm No Drawing. Application April 9, 1954
Serial No. 422,253

Claims priority, application Switzerland April 20, 1953

4 Claims. (Cl. 260—461)

This invention provides new organic compounds containing phosphorus which correspond to the general formula

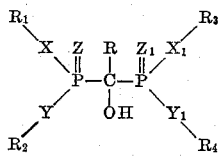

in which R—R$_4$ represent alkyl, cycloalkyl, aralkyl, aryl or heterocyclic radicals which may contain substituents, and in which R$_1$ and R$_2$, on the one hand, and R$_3$ and R$_4$, on the other, may form part of a ring system, X, X$_1$, Y and Y$_1$ represent —O—, —S—, —NH— or >NR$_1$, and Z and Z$_1$ represent oxygen or sulfur.

When the symbols R—R$_4$ represent aliphatic radicals, such radicals may have a straight or branched chain and be saturated or unsaturated, and they may be unsubstituted or may contain substituents. There may be mentioned, for example, methyl, ethyl, propyl, isopropyl, butyl, hexyl, 2-ethylbutyl, octyl, 2-butyloctyl, lauryl, octadecyl, allyl or 2-chlorethyl radicals, or they may represent radicals containing thiocyano, cyano or ester groups. The radicals R—R$_4$ may be identical or different from one another. When R—R$_4$ represent aromatic radicals, such radicals may be mononuclear or polynuclear, and may, if desired, contain nuclear substituents. There may be mentioned, for example, phenyl, 2- or 4-chlorophenyl, 2:4-dichlorophenyl, 4-methoxyphenyl, 4-nitrophenyl, naphthyl and 4-diphenyl groups. When R—R$_4$ represent araliphatic radicals, such radicals may be a benzyl group, and as a cycloaliphatic radical there may be mentioned the cyclohexyl group and as a heterocyclic radical the tetrahydrofurfuryl group.

The invention also includes a process for making the compounds of the above general formula, wherein a compound of the general formula (1)

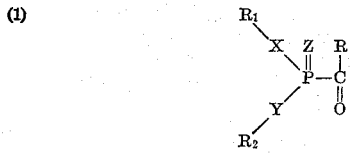

in which R, R$_1$, R$_2$, X, Y and Z have the meanings given above, is condensed with a compound of the general formula (2)

in which R$_3$, R$_4$, X$_1$, Y$_1$ and Z$_1$ also have the meanings given above. Among the above starting materials there are especially suitable owing to the ease with which they can be obtained those in which X and Y, and X$_1$ and Y$_1$, respectively represent —O—.

The compounds of the general Formula 1 are known or can be made by methods in themselves known, for example, by reacting a compound of the formula

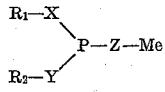

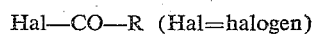

(Me=an atom of a metal)

with a carboxylic acid halide of the formula

Hal—CO—R (Hal=halogen)

in the manner described in U. S. Patent application Serial No. 422,251, filed on even date herewith.

The compounds of the general Formula 2 when X$_1$, Y$_1$ and Z$_1$ represent oxygen, are diesters of phosphorous acid. There may be mentioned, for example, diethylphosphite, dibutylphosphite, diphenylphosphite and dibenzylphosphite. Analogous derivatives of thiophosphorous acid are those in which Z$_1$ represents sulfur. These starting materials are also known or can be made by methods in themselves known.

The condensation of the process of this invention is advantageously carried out in the presence of an alkaline condensing agent. As such condensing agents there come into consideration tertiary amines such as trialkylamines, for example triethylamine or tributylamine, and also alkali metal and alkaline earth metal salts of weak acids, such as potassium carbonate, barium acetate or sodium acetate. There may also be used alkali metal alcoholates such as sodium methylate. There are advantageously used alkali salts of the compounds of the general Formula 2.

For the production of symmetrical compounds, that is to say, those in which R$_1$ and R$_3$, R$_2$ and R$_4$, X and X$_1$, Y and Y$_1$ and Z and Z$_1$ are identical, it is of advantage to carry out the synthesis by reacting two mols of a compound of the formula

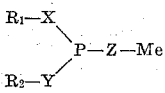

(Me=an atom of a metal)

with 1 mol of a carboxylic acid halide of the formula

Hal—CO—R

In this manner the products of the invention are obtained directly without the need to isolate as an intermediate product a compound of the Formula 2.

The reaction between the components is often exothermic so that, if desired, it may be necessary to bring them together while cooling and to dilute them with an inert solvent such as benzene, toluene, ether, dioxane, hexane or low boiling benzine. It is of advantage to complete the reaction by heating at a temperature of about 40–120° C. Provided that the reaction components are suitably selected the condensation products can be distilled under reduced pressure.

It has also been found that the hydroxyl group present in the final products may be converted. Thus, for example, it may be esterified or etherified. Depending on their constitution the products of the invention are high boiling oils or solid substances. They can be used as intermediate products for a very wide variety of purposes; furthermore, suitably substituted products can be used as additives for lubricants. A few of them are active against animal pests and may therefore be incorporated as active substances in preparations for combating pests, while others have a general influence on biological processes, for example an inhibiting action on serum cholinesterase, and can therefore be used in the pharmaceutical field.

The following examples illustrate the invention, the parts being by weight unless otherwise stated and the relationship of parts by weight to parts by volume being the same as that of the kilogram to the liter:

Example 1

14 parts of sodium are suspended in 400 parts by volume of anhydrous ether, and 84 parts of diethylphosphite are introduced dropwise in the course of 10 minutes. The whole is heated for 2 hours at 40° C., and then 27 parts of acetyl chloride are added while cooling. After 2 hours the precipitated sodium chloride is filtered off, and after evaporating the ether, the residue is distilled. 1:1-diphosphonic acid diethyl ester-ethanol of the formula $$\begin{array}{c} C_2H_5O \\ \diagdown \\ C_2H_5O \end{array} P \begin{array}{c} O \\ \diagup \\ \diagdown \end{array} \begin{array}{c} CH_3 \\ | \\ C \\ | \\ OH \end{array} \begin{array}{c} O \\ \| \\ P \end{array} \begin{array}{c} O-C_2H_5 \\ \diagup \\ O-C_2H_5 \end{array}$$

passes over at 139–140° C. under 0.2 mm. pressure in the form of a colorless liquid. On topical application to the eye, the product has a prolonged miotic effect and strongly inhibits serum cholinesterase.

Example 2

7 parts of sodium are reacted in 400 parts by volume of anhydrous ether with 42 parts of diethyl phosphite. 14 parts of propionyl chloride are added to the reaction mixture in the course of 10 minutes, while cooling. After 2 hours the precipitated sodium chloride is filtered off, the ether is evaporated from the filtrate, and the residue is distilled. 1:1-diphosphonic acid diethyl ester-n-propanol of the formula $$\begin{array}{c} C_2H_5O \\ \diagdown \\ C_2H_5O \end{array} P \begin{array}{c} O \\ \| \\ \diagup \end{array} \begin{array}{c} CH_3 \\ | \\ CH_2 \\ | \\ C \\ | \\ OH \end{array} \begin{array}{c} O \\ \| \\ P \end{array} \begin{array}{c} O-C_2H_5 \\ \diagup \\ O-C_2H_5 \end{array}$$

passes over at 157–158° C. under 0.2 mm. pressure in the form of a colorless liquid.

Example 3

42 parts of diethylphosphite are added dropwise to 7 parts of sodium suspended in 400 parts by volume of anhydrous ether. After the reaction mixture has been heated for 2 hours at 40–50° C., 46 parts of benzoyl chloride are added, while cooling. The whole is then allowed to stand for 2 hours at 40° C., and is then filtered, and, after the ether has been evaporated, the oil which remains behind is fractionated. α:α-Diphosphonic acid diethyl ester-benzyl alcohol of the formula $$\begin{array}{c} C_2H_5-O \\ \diagdown \\ C_2H_5-O \end{array} P \begin{array}{c} O \\ \| \\ \diagup \end{array} \begin{array}{c} OH \\ | \\ C \\ | \\ C_6H_5 \end{array} \begin{array}{c} O \\ \| \\ P \end{array} \begin{array}{c} O-C_2H_5 \\ \diagup \\ O-C_2H_5 \end{array}$$

distils at 175–177° C. under 0.2 mm. pressure and α:α-diphosphonic acid diethyl ester-benzyl benzoate of the formula

[structure with benzoate group, C(O-CO-C₆H₅)(P(O)(OC₂H₅)₂)₂ type structure, phenyl substituent]

distils at 190–192° C. under 0.2 mm. pressure.

Example 4

4.6 parts of sodium are reacted in 300 parts by volume of anhydrous ether with 28 parts of diethylphosphite, while cooling. The mixture is allowed to stand for ½ hour at 40° C., and then 12.5 parts of chloracetylchloride are added dropwise while cooling. After heating the mixture for one hour at 40° C., it is filtered, the ether is evaporated, and the residue is distilled. 1:1-diphosphonic acid diethyl ester-2-chlorethanol of the formula $$\begin{array}{c} C_2H_5O \\ \diagdown \\ C_2H_5O \end{array} P \begin{array}{c} O \\ \| \\ \diagup \end{array} \begin{array}{c} Cl \\ | \\ CH_2 \\ | \\ C \\ | \\ OH \end{array} \begin{array}{c} O \\ \| \\ P \end{array} \begin{array}{c} O-C_2H_5 \\ \diagup \\ O-C_2H_5 \end{array}$$

is obtained at 127–128° C. under 0.1 mm. pressure in the form of a colorless liquid.

Example 5

84 parts of diethylphosphite are added to 14 parts of sodium suspended in 800 parts by volume of anhydrous ether, while cooling, and then the mixture is heated for one hour at 40° C. 44 parts of dichloroacetyl chloride are then added dropwise, while cooling. The reaction mixture is stirred for 3 hours at 40° C., filtered, and, after removing the solvent, the oil which remains behind is distilled. 1:1-diphosphonic acid diethyl ester-2:2-dichlorethanol of the formula $$\begin{array}{c} C_2H_5O \\ \diagdown \\ C_2H_5O \end{array} P \begin{array}{c} O \\ \| \\ \diagup \end{array} \begin{array}{c} Cl \\ | \\ Cl-C-H \\ | \\ C \\ | \\ OH \end{array} \begin{array}{c} O \\ \| \\ P \end{array} \begin{array}{c} O-C_2H_5 \\ \diagup \\ O-C_2H_5 \end{array}$$

is obtained at 127–128° C. under 0.12 mm. pressure.

Example 6

14 parts of sodium in 800 parts by volume of anhydrous ether are reacted with 84 parts of diethyl phosphite, while cooling. The mixture is allowed to stand at 40° C. for one hour, and then 54 parts of trichloracetyl chloride are added, while cooling. After allowing the mixture to stand for 3 hours at room temperature, the precipitated salt is filtered off and, after removing the solvent, the residue is distilled. 1:1-diphosphonic-acid diethyl ester-2:2-trichlorethanol of the formula $$\begin{array}{c} C_2H_5-O \\ \diagdown \\ C_2H_5-O \end{array} P \begin{array}{c} O \\ \| \\ \diagup \end{array} \begin{array}{c} CCl_3 \\ | \\ C \\ | \\ OH \end{array} \begin{array}{c} O \\ \| \\ P \end{array} \begin{array}{c} O-C_2H_5 \\ \diagup \\ O-C_2H_5 \end{array}$$

passes over at 143–144° C. under 0.1 mm. pressure.

Example 7

5.4 parts of acetyl-diethylphosphonate are heated for 15 minutes at 75° C. with 5 parts of diethyl phosphite and 0.5 part of triethylamine. By distilling the reaction mixture there is obtained at 139° C. under 0.1 mm. pressure 1:1-diphosphonic acid diethyl ester-ethanol of the formula $$\begin{array}{c} C_2H_5O \\ \diagdown \\ C_2H_5O \end{array} P \begin{array}{c} O \\ \| \\ \diagup \end{array} \begin{array}{c} CH_3 \\ | \\ C \\ | \\ OH \end{array} \begin{array}{c} O \\ \| \\ P \end{array} \begin{array}{c} O-C_2H_5 \\ \diagup \\ O-C_2H_5 \end{array}$$

What is claimed is:

1. An organic compound containing phosphorus, which corresponds to the general formula $$\begin{array}{c} R_1 \\ \diagdown \\ R_2 \end{array} \begin{array}{c} O \\ \diagup \\ \diagdown \end{array} P \begin{array}{c} O \\ \| \\ \diagup \end{array} \begin{array}{c} R \\ | \\ C \\ | \\ OH \end{array} \begin{array}{c} O \\ \| \\ P \end{array} \begin{array}{c} O \\ \diagup \\ \diagdown \end{array} \begin{array}{c} R_3 \\ \diagup \\ R_4 \end{array}$$

in which $R_1$–$R_4$ each represents lower alkyl and R represents a member selected from the group consisting of lower alkyl, chlorinated lower alkyl and phenyl.
2. The compound of the formula
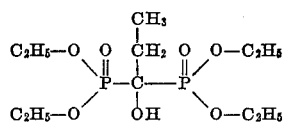
3. The compound of the formula
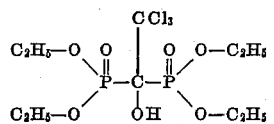
4. The compound of the formula
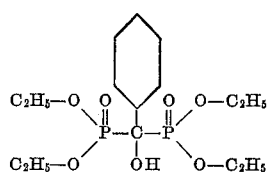
References Cited in the file of this patent
UNITED STATES PATENTS
2,651,656     Ladd et al. _____ Sept. 8, 1953